(12) United States Patent
Hirzalla et al.

(10) Patent No.: US 6,633,651 B1
(45) Date of Patent: Oct. 14, 2003

(54) METHOD AND APPARATUS FOR RECOGNIZING VIDEO SEQUENCES

(75) Inventors: Nael Hirzalla, Orleans (CA); Paul Streatch, Richmond (CA); Roger MacLean, Nepean (CA); Robert Menard, Nepean (CA)

(73) Assignee: March Networks Corporation, Kanata (CA)

( * ) Notice: Subject to any disclaimer, the term of this patent is extended or adjusted under 35 U.S.C. 154(b) by 0 days.

(21) Appl. No.: 09/341,980

(22) PCT Filed: Feb. 5, 1998

(86) PCT No.: PCT/GA98/00069
§ 371 (c)(1),
(2), (4) Date: Nov. 1, 1999

(87) PCT Pub. No.: WO98/35492
PCT Pub. Date: Aug. 13, 1998

(30) Foreign Application Priority Data

Feb. 6, 1997 (CA) .............................................. 2196930

(51) Int. Cl.[7] .................................................. G06K 9/64
(52) U.S. Cl. ........................ 382/100; 382/170; 382/218; 725/19
(58) Field of Search ................................. 382/100, 209, 382/217, 218, 168, 170; 725/19, 22; 348/907

(56) References Cited

U.S. PATENT DOCUMENTS

| | | | | |
|---|---|---|---|---|
| 4,230,990 A | * | 10/1980 | Lert et al. ...................... | 725/22 |
| 4,697,209 A | * | 9/1987 | Kiewit et al. .................. | 725/19 |
| 4,739,398 A | * | 4/1988 | Thomas et al. ................ | 725/22 |
| 5,019,899 A | * | 5/1991 | Boles et al. ................... | 725/22 |
| 5,404,160 A | * | 4/1995 | Schober et al. ............... | 725/20 |
| 5,436,653 A | * | 7/1995 | Ellis et al. ..................... | 725/22 |

OTHER PUBLICATIONS

Kenyon et al. "High Capacity Real Time Broadcast Monitoring." IEEE Int. Conf. on Systems, Man and Cybernetics: Decision Aiding for Complex Systems, vol. 1, Oct. 1991, pp. 147–152.*

* cited by examiner

*Primary Examiner*—Jon Chang
(74) *Attorney, Agent, or Firm*—Marks & Clerk

(57) ABSTRACT

A method of detecting video sequences involves creating on-the-fly candidate digital signatures uniquely characteristic of successive groups of frames in accordance with a predetermined algorithm. The candidate digital signatures are compared with at least one signature of a stored sequence created in accordance with the predetermined algorithm. A candidate is identified as corresponding to the stored sequence in the event of a positive match.

15 Claims, 5 Drawing Sheets

METHOD AND APPARATUS FOR RECOGNIZING VIDEO SEQUENCES

FIELD OF THE INVENTION

This invention relates to video processing and more particularly to a method and apparatus for the automatic recognition of video sequences.

BACKGROUND OF THE INVENTION

The reliable automatic recognition of video sequences has application in a number of areas. One application, for example, is the recognition of video commercials. Marketing executives, for example, may wish to know when and how often a particular commercial has been broadcast.

Clearly, one possibility would be to store an entire video sequence and continually compare broadcast signals with a library of stored sequences. This solution is not very practical since it would require a prohibitive amount of memory and processing power to implement.

EP 283570 teaches the use of digital signatures to match video sequences. However, such signatures, for example, representing the time between black scenes or color changes are insufficient to permit fast and accurate matching of complex video sequences.

EP 367585 describes a method of video recognition that involves creating digital signatures for all the frames in a sequence. This method involves an undue amount of processing power.

An object of the invention is to alleviate this problem and provide a practical method of recognizing a predetermined video sequence that is reasonably accurate yet at the same time requires an acceptable amount of processing power.

SUMMARY OF THE INVENTION

According to the present invention there is provided a method of detecting video sequences comprising the steps of receiving an incoming video stream consisting of sequences of successive frames, creating on-the-fly digital signatures in accordance with a predetermined algorithm, comparing said digital signatures with a plurality of stored digital signatures created in accordance with said predetermined algorithm, and identifying a candidate sequence of said incoming video stream as corresponding to said stored sequence in the event of a positive match of said digital signatures in accordance with predetermined criteria, characterized in that selected special frames of predetermined type are identified in said sequences, unique digital signatures are created for said special frames, said unique digital signatures being uniquely dependent on the individual characteristics of said special frames, said digital signatures of said special frames of a sequence collectively form a signature file for the sequence, and the digital signatures of the special frames are matched with the digital signatures of frames of the same type in stored signature files to identify a candidate sequence.

The video sequence is in digital form, either as a result of analog-to-digital conversion of an analog broadcast signal or the signal being in digital format.

A video stream is composed of a sequence of frames, each being consisting of a grid of pixels. Pixel values can be represented, for instance, by their red, green, and blue components, or by hue, luminance and saturation. In a preferred embodiment, the digital signature is derived from the pixel values of the frames intelligently selected from those forming a video sequence.

The digital signature can be created from a live or recorded video sequence. It can be stored in a file, which can, for example, contain the duration of the sequence, the number of hue or luminance categories considered, and for each selected frame in the sequence, a histogram representing the percentage of pixels in the defined categories, and scene information taken from a SmartFrame™ encoder, as described in our U.S. Pat. No. 6,415,000, entitled METHOD OF PROCESSING A VIDEO STREAM, which is herein incorporated by reference. This encoder extracts information relating the difference in pixel values pairs of frame in a sequence.

The processing engine can then compare one or more stored signatures to a candidate live or recorded video stream to find a match. The candidate signature is created in the same manner as the stored signatures, except that in the case of the candidate sequence, the signature is created "on-the-fly", i.e. on a real-time basis. The candidate signature is a moving signature. This means that it is created from successive overlapping groups of frames.

The processing engine must continually slot the stored signature in time with the target video stream and generate an alert when there is a positive match. A signature must be re-slotted when it is determined that the target stream stops following or matching it. This operation is performed using a slider routine to be described in detail below.

It should be noted that the stored video signature frame size and sample rate do not have to match the video frame size and sample rate of the candidate sequence, which may, for example, be a broadcast signal. The video signature matching will tolerate varying broadcast quality.

In order to reduce the amount of required processing and memory power, the signature file preferably only contains the signatures or histograms of a limited number of frames in a video sequence. These frames are preferably frames having a particular significance, namely "cuts" which represent sudden changes in scene, "time-outs", which are frames which occur after a predetermined period of time in the sequence when no "cuts" have been detected, and "start-frames", which are simply the first frame in a particular sequence. For example, if the signature file is to be created for a particular commercial, first a histogram is taken for the first frame in the sequence and this is stored as the first signature in the signature file. The system then waits for the first frame corresponding to a cut, and stores this as the next signature unless a certain time, say two seconds, has elapsed without a cut occurring, in which case the signature of the next frame is taken and this is tagged as a "time-out" frame. This is to ensure that histograms are stored even when a sequence does not include cuts.

The present invention can offer a high percentage hit rate and a low percentage false hit rate.

The invention also provides an apparatus for detecting video sequences comprising means for receiving an incoming video stream consisting of sequences of successive frames, means for creating on-the-fly digital signatures in accordance with a predetermined algorithm, means for comparing said digital signatures with a plurality of stored digital signatures created in accordance with said predetermined algorithm, and means for identifying a candidate sequence of said incoming video stream as corresponding to said stored sequence in the event of a positive match of said digital signatures in accordance with predetermined criteria, characterized in that said means for creating on-the-fly digital signatures selects special frames of predetermined type in said sequences and creates unique digital signatures for said special frames, said unique digital signatures being uniquely dependent on the individual characteristics of said special frames, and said digital signatures of said special frames of a sequence collectively forming a signature file for the sequence, and said means for identifying a candidate sequence matches the digital signatures of the special frames with the digital signatures of frames of the same type in stored signature files to identify the candidate sequence.

The invention can be implemented in an IBM compatible personal computer equipped, for example, with a Pentium microprocessor and a commercial video card.

BRIEF DESCRIPTION OF THE DRAWINGS

The invention will now be described in more detail, by way of example, only with reference to the accompanying drawings, in which.

DETAILED DESCRIPTION OF THE PREFERRED EMBODIMENTS

Figure 1:
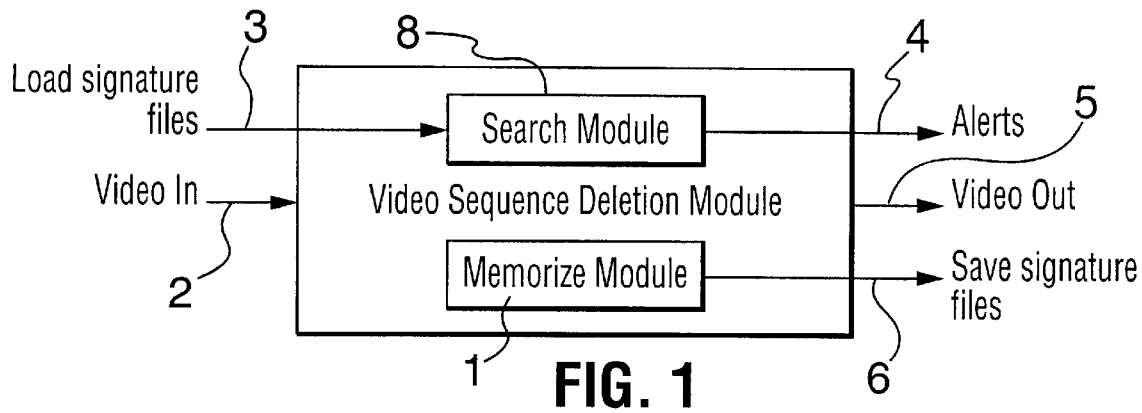
FIG. 1 is a block diagram of an video recognition apparatus in accordance with the invention.

Referring to FIG. 1, an apparatus 1 in accordance with the invention, which may, for example, be a Pentium™ computer with any suitable commercially available video card. Such cards are readily available in computer stores. The apparatus 1 comprises a first input 2 for an input video stream, for example, a video broadcast stream, and a second input 3 for loading signature files, for example, from a hard disk. The apparatus 1 has an alert output 4, a video output 5, and a signature file output 6 for storing signature files on a hard disk (not shown) when in the memorize mode.

In the memorize mode, memorize module 7 takes a video input stream and operates on it in the manner described in the following algorithms to create a signature file, which is stored on the hard disk through output 6. This operation can be repeated for a number of video sequences, which it is desired to recognize, with the multiple signature files forming a library.

In the search mode, search module 8 first loads a signature file or a series of stored signature files from the hard disk through input 3. For convenience, the operation of the invention will be described on the assumption that only one signature file is loaded. For example, it might be desired to monitor a live video stream to find all occurrences of a particular commercial. In such as case, the search module loads the signature file corresponding to the particular commercial. It then takes a candidate video stream over input 2, creates a digital signature file on-the-fly for a candidate video sequence, and then sequentially compares the signature file with the loaded file to find a match. When a match is found, the apparatus outputs an alert signal on output 4. The alert signal can take any form. It can be a visual or audible alert, or it can be used to take some action such as increment a counter.

It will be understood, however, that the system described below can load a number of signature files simultaneously, in which case the multiple incidences of the search algorithm are rum on each signature file in parallel.

Figure 2:
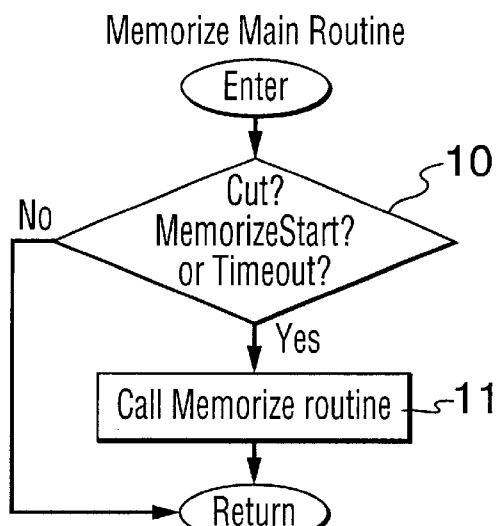
FIG. 2 shows the main routine of the memorize module of the apparatus shown in FIG. 1.
Figure 3:
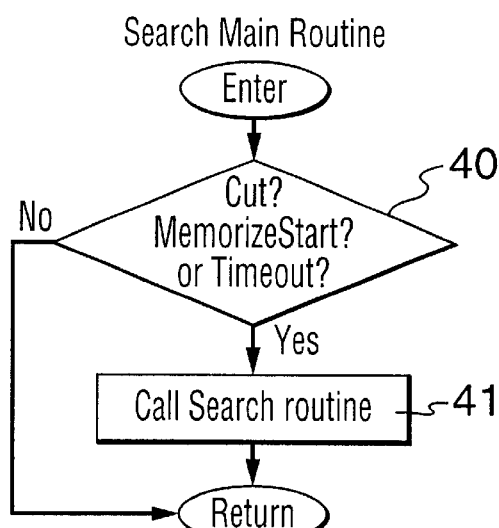
FIG. 3 shows the main routine of the search module of the apparatus shown in FIG. 1.

FIG. 2 shows the main routine for the memorize module 1. An incoming video stream on line 2 is continually monitored on a frame by frame basis. Block 10 determines whether the memorize routine has been started by the operator (Start frame), identifies cuts in a scene (Cut), for example, using the technique described in our co-pending application referred to above, or determines whether a timeout has occurred (Time-out).

The memorize routine is normally started by an operator. This sets a MemorizeStarted flag, for example, a single memory bit, to mark the next frame. It also starts a timer that times out after a predetermined time, for example, two seconds. The memorize routine which is called by the timer operates on the first frame, when it is called by the Memorizestart flag, the first frame after a cut detection, or when a timeout occurs. A timeout occurs when the timer expires without a cut being detected. This ensures that frames are analyzed when the cuts are far apart or even when no cuts are present.

Figure 5:
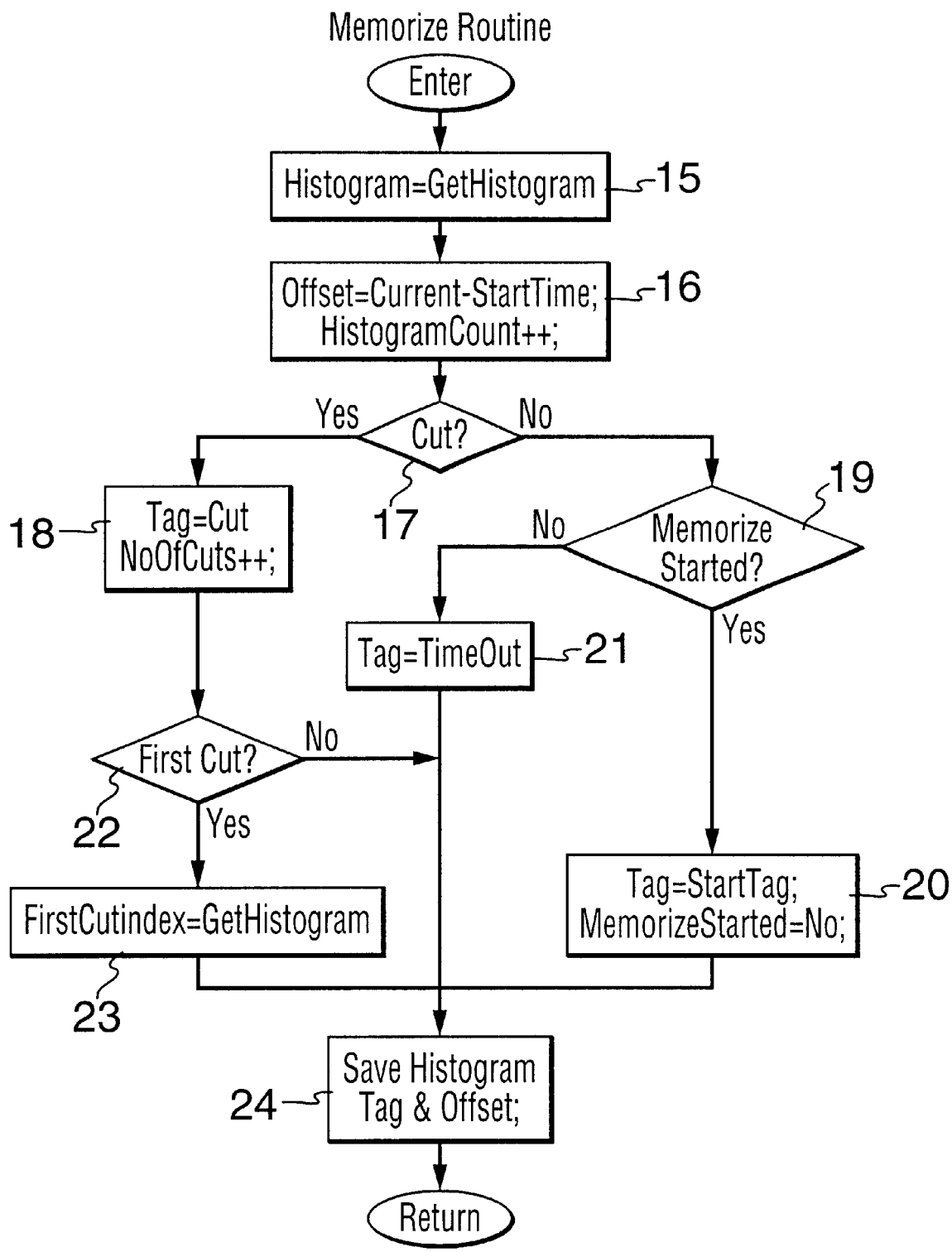
FIG. 5 shows the memorize algorithm.

Upon detection of a frame matching one of the above criteria, the memorize routine shown in FIG. 5 is called. At step 15, this creates a histogram for the current frame as described above and sets the variable Histogram to the histogram for the frame. Step 16 sets the variable Offset to the value of the current time—the start time of the sequence, and increments the histogram count.

Step 17 determines whether the frame represents a cut, i.e. a change in scene. If so, the variable Tag is set to the value Cut, and the number of cuts is incremented at step 18. If not, step 19 determines whether the Memorizestarted flag is set, i.e. whether the frame represents the first frame of the sequence. If so, the variable Tag is set to StartTag, and the variable Memorizestarted is reset at step 20 since the next frame will not be the first frame of the sequence. If the Memorizestarted flag is not set at step 19, the variable Tag is set to timeout at step 21 since this is the only remaining possibility, namely that the memorize sequence has been started, no cut has been detected, but the timer has timed out, indicating that a frame should be analyzed and stored anyway.

Step 22 determines whether the detected cut is the first, and if so sets the variable FirstcutIndex to the Histogram count at step 23.

Finally, the variables Histogram, Tag, and Offset are saved at step 24, and the program looped back to the main memorize routine shown in FIG. 2.

Figure 4:
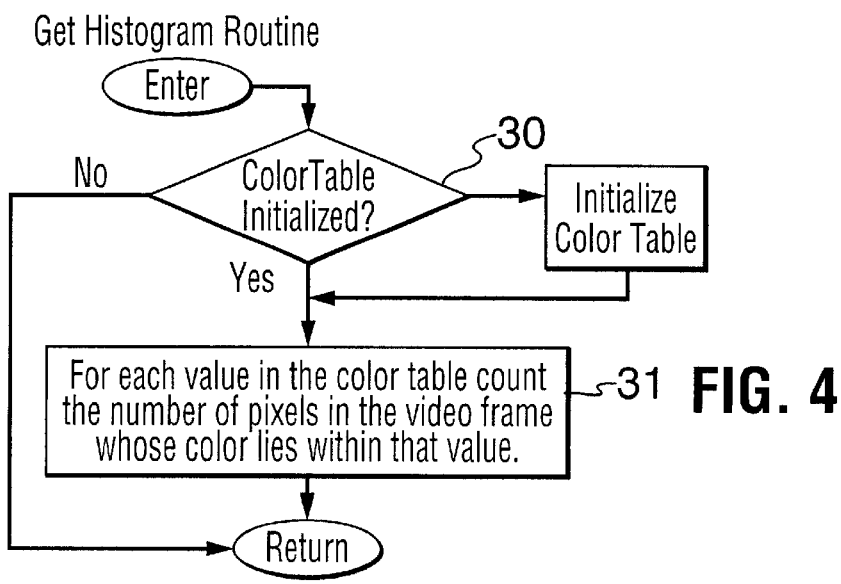
FIG. 4 shows the algorithm for obtaining a digital signature.

The GetHistogram routine called by step 15 is shown in FIG. 4. First the colour table is initialized if necessary. The colour table consists of a number of colour (hue) categories, typically 256, as well as a similar number of luminance categories. Step 31 determines for each value in the colour table the number of pixels whose colour lies within that value in the current frame. The resulting table is stored as the variable Histogram at step 15 of FIG. 5.

A typical sequence that can be memorized by an apparatus in accordance with the invention is a Sprint commercial. This has a length of 30 seconds or approximately 390 captured frames with 11 scene changes, which are either sharp or gradual cuts. In this example, the computer considers only 17 frames, of which 11 represent cuts, one represents the first frame, and five represent timeouts, i.e. where no cuts have been detected after a predetermined period of time. The signature for this sequence would contain 17 tables (histograms).

The use of tagged histograms, according to whether they relate to frames that are Cuts, Start frames, or Time-outs, considerably enhances the efficiency of the search routine.

Figure 6:
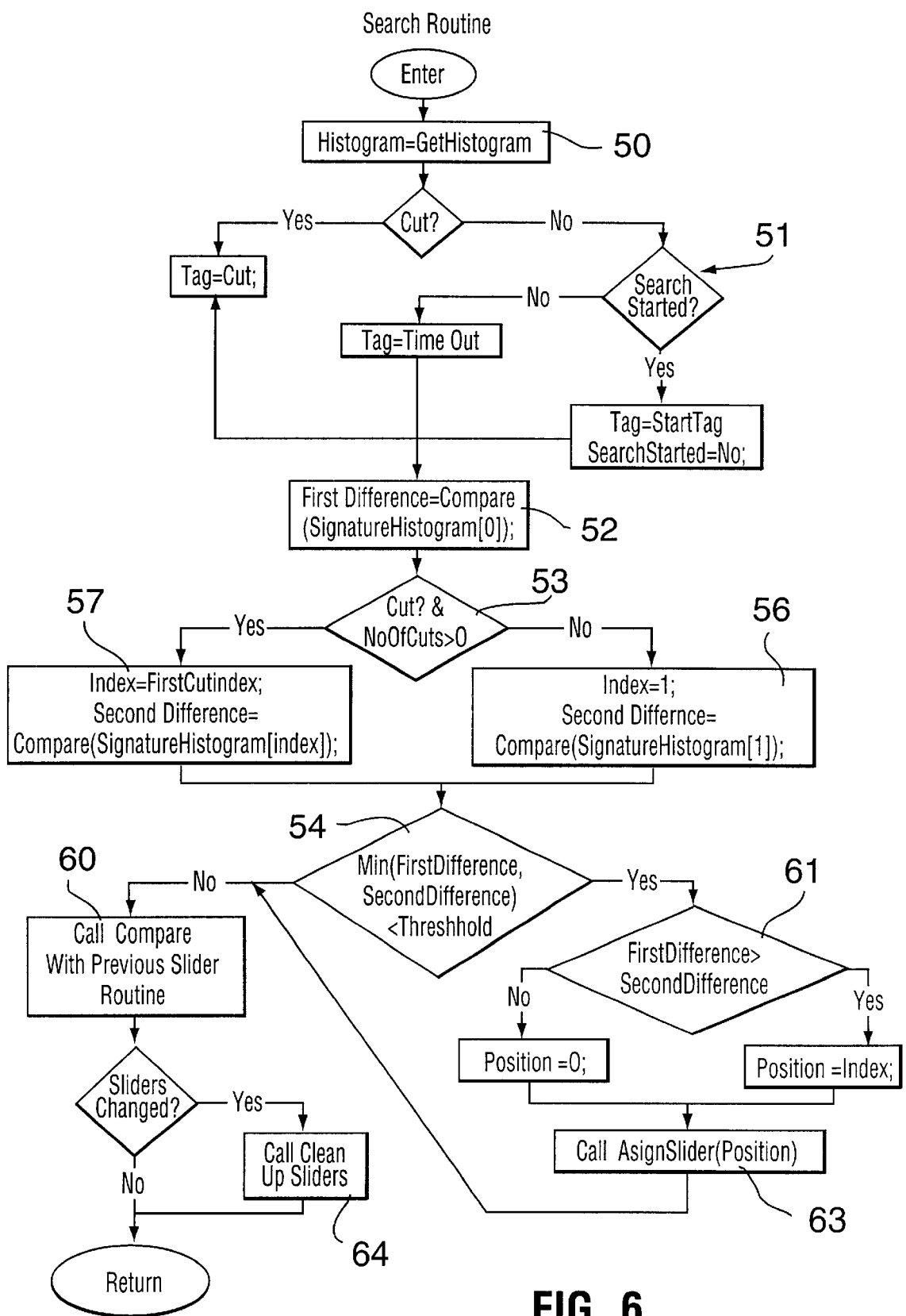
FIG. 6 shows the search algorithm.

FIG. 6 shows the main search routine implemented by the search module 8 on an incoming video steam.

The search may be started by operator intervention. This sets the SearchStarted flag in a similar manner to the Memorizestarted flag in FIG. 2. Step 40 determines whether the Searchstarted flag has been set, which indicates the start of a new video sequence to search. If this has been set or a cut is detected or a timeout occurs in the absence of a detected cut, step 41 calls the search routine shown in FIG. 6.

Step 50 sets the variable Histogram using the routine shown in FIG. 4 in a similar manner to the Memorize routine. The blocks generally designated 51 then decide whether the current frame represents a cut, a timeout or a Searchstarted frame, i.e. the first frame in a search sequence.

Step 52 sets the variable FirstDifference equal to the difference between the current histogram and the first signature histogram (0), i.e. the histogram for frame zero in the signature file.

Step 53 determines whether the frame represents a cut and the stored signature file contains at least one cut-tagged histogram. If so, block 57 sets the variable Index equal to Firstcutindex, and the variable SecondDifference equal to the result of comparing the histogram for the frame with the first cut-tagged histogram for the signature file. If not the variable Index is set to 1 in block 56 and the variable SecondDifference is set to the result of the comparison between the current histogram (Histogram) and the second histogram of the signature file (corresponding to the Index 1. The variable Index starts at 0).

Step 54 then determines whether either of the FirstDifference or Second Difference is less than a threshold. If yes, which indicates a positive match of the histogram for the current frame with the selected histogram in the signature file, the program sets the variable Position to the Index value that corresponds to the smaller of the two (FirstDifference and SecondDifference), and calls an assign slider routine (block 63), which will be described in more detail below. If not, which indicates the absence of a match, the program calls a compare with previous sliders routine at block 60. Both these routines will be described in more detail.

Figure 7:
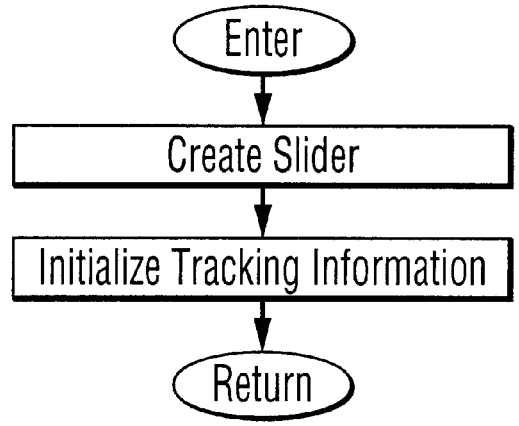
FIG. 7 shows the assign slider routine.

The assign slider routine is shown in FIG. 7. The slider is essentially a pointer identifying a particular frame in the signature file whose histogram matches the current or most recently matched frame in the video sequence. Each time a first match occurs, a "slider" is assigned. The compare sliders routine to be described below with reference to FIG. 8 then attempts to match the subsequent histograms in the signature file with the current video sequence, and moves the pointer (slider) by one histogram towards the last histogram in the file whenever a match occurs.

In the search routine, the system in effect builds one large file adding one table or histogram every time a scene changes (cut) or a timeout occurs. An attempt is made to fit the stored signature of the candidate sequence by "sliding" it within the large signature file until a complete match is found. This is the function of the portion of the routine generally shown in FIG. 8.

Figure 8:
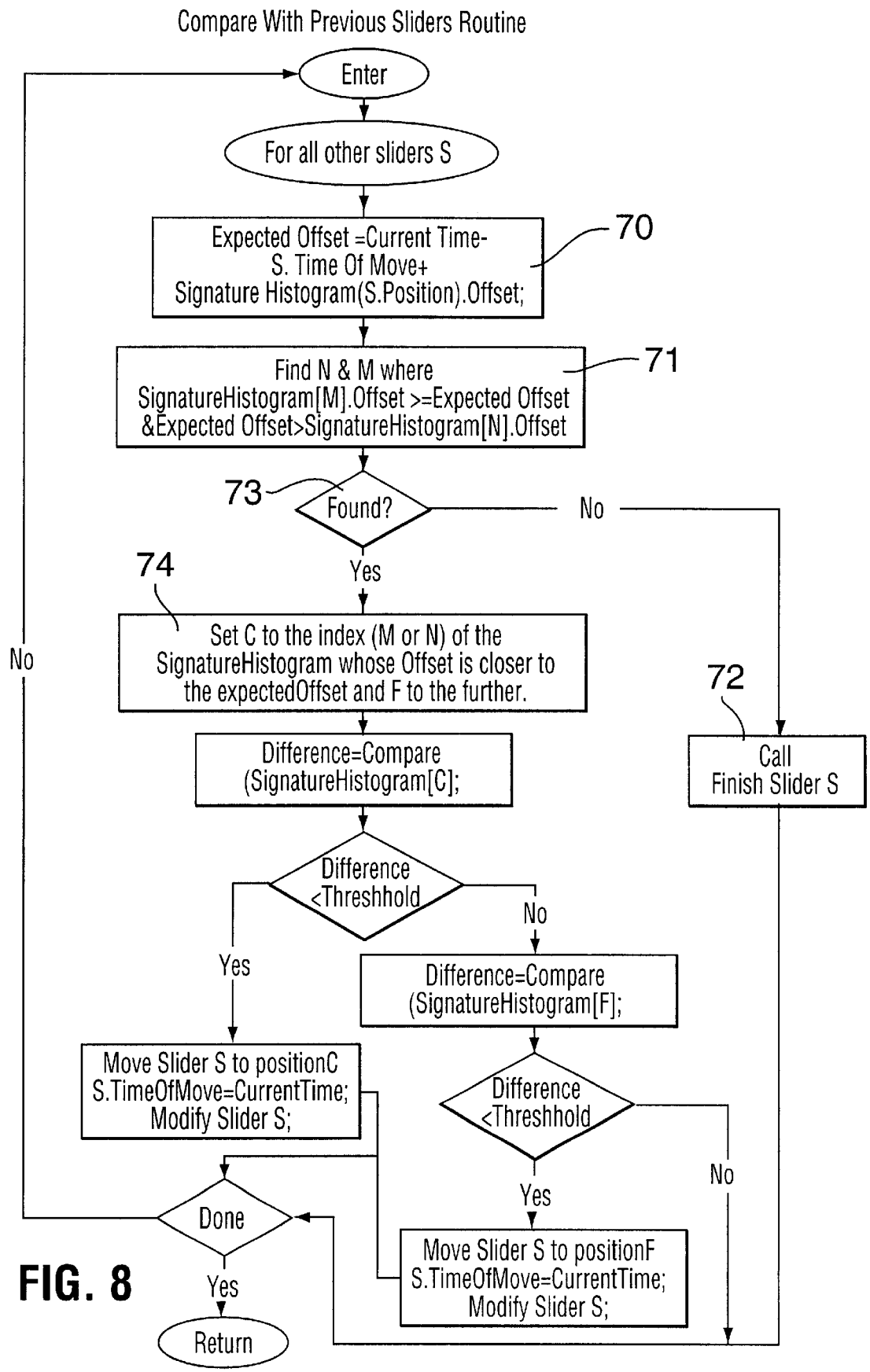
FIG. 8 shows a routine for making a comparison with previous sliders.

FIG. 8 shows the routine for making a comparison with previous sliders. This routine in effect slides the candidate file within the stored signature file so as to determine whether the whole file matches the signature file. It is called by the block 60 shown in FIG. 6. Block 70 sets the variable ExpectedOffset to the CurrentTime—the time the current slider was last moved+the offset of the signature histogram which the current slider points to. Block 71 then looks N and M where the signature histogram offset is greater or equal, and smaller, respectively the ExpectedOffset. If no such index is found at condition step 73, the slider routine is terminated at block 72 and a determination made as to whether the current sequence matches the sequence for which the signatures are stored in the stored signature file.

If such an index is found at step 73, step 74 looks for a value C and F (from N and M) wherein the Offset is closer and further respectively to the ExpectedOffset set at step 70.

Essentially, the slider routine enables a complete video sequence to be matched "on the fly" with good accuracy. For example, assume a the histogram for a frame in the incoming video sequence, which is identified, for example, as a Cut, matches the first frame representing a cut in the signature file. This indicates the possibility of a sequence match, but the match could also be the result of chance. If however, the next Cut in the video sequence matches the second Cut in the signature file, the chances of a sequence match are increased, and so on until the end of the signature file is reached. If each successive Cut in a particular target sequence matches each corresponding successive Cut in the signature file, it becomes highly probable that the sequences do in fact match. Block 72 can assume a positive match if all or a predetermined number of frames within the stored signature file match the frames in the incoming sequence.

Figure 9:
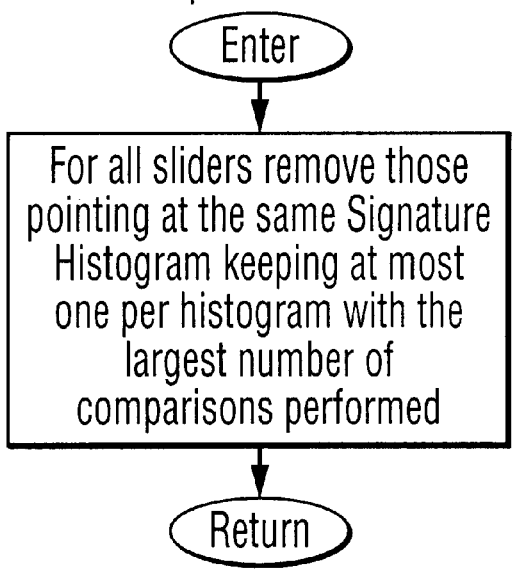
FIG. 9 shows a routine for cleaning up sliders.
Figure 10:
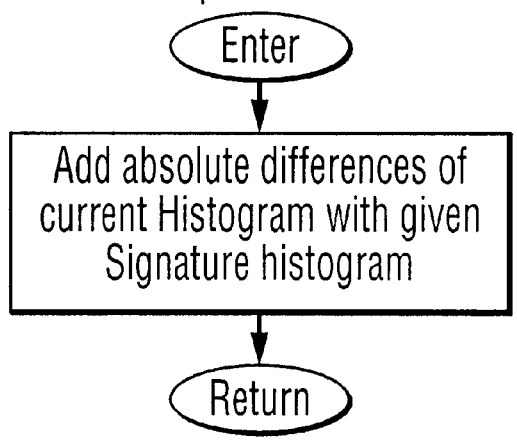
FIG. 10 shows a comparison routine.

Because the method operates on the fly with a continuous incoming video stream, it is possible for there to be more than one slider pointing to a particular histogram in the signature file. The Clean up sliders routine called by block 64 and shown in FIG. 9 removes redundant sliders on a particular histogram, retaining only the slider for which the largest number of comparisons have been performed.

The described method permits video sequences to be matched with good accuracy in real time with the processing power available on a standard PC-based system and without having prohibitive memory requirements.

Although preferred embodiments of the invention have been illustrated in the accompanying drawings and described in the foregoing detailed description, it will be understood that the invention is not limited to the embodiments discloses, but is capable of numerous rearrangements, modifications and substitutions of parts and elements without departing from the spirit of the invention which is defined in the following claims.

What is claimed is:

1. A method of detecting video sequences comprising the steps of:
   receiving one or more reference video streams consisting of sequences of successive frames;
   identifying selected special frames of predetermined type in said one or more reference video streams;
   creating a unique digital signature file for each said reference video stream that is uniquely dependent on the individual characteristics of said special frames, said unique digital signature file comprising a table for each special frame identifying the proportion of pixel values in defined categories;
   storing said unique digital signature file for each said reference stream in a memory;

receiving a candidate video stream consisting of sequences of successive frames;

identifying said selected special frames of predetermined type in said candidate video stream;

creating a unique digital signature file for each said candidate video stream that is uniquely dependent on the individual characteristics of said special frames;

comparing said unique digital signature file of said candidate video stream with each said stored digital signature file; and identifying said candidate video stream as corresponding to a reference video steam in the event of a positive match of said digital signature files of said reference stream and said candidate stream in accordance with predetermined criteria.

2. A method as claimed in claim 1, wherein said defined categories are luminance and hue.

3. A method as claimed in claim 1, wherein said signature file also includes the duration of the sequence.

4. A method as claimed in claim 1, wherein said signature file also includes the number of luminance or hue categories considered.

5. A method as claimed in claim 1, wherein said signature file also includes information relating the difference in pixel value pairs of frames in a sequence.

6. A method as claimed in claim 1, wherein said special frames correspond to a Cut, a Startframe, or a Timeout.

7. A method as claimed in claim 6, wherein when a match is found between the digital signature of a frame in the candidate sequence and the stored sequence, the frame in the stored sequence is tagged, an attempt is made to match each successive frame of the same type in the target sequence with the corresponding frame of the same type in the stored sequence and so on to the end of the stored sequence, and a match of sequences is determined to occur when the number of matches in a sequence exceeds a predetermined value.

8. A method of detecting video sequences comprising the steps of:

receiving one or more reference video streams consisting of sequences of successive frames;

identifying selected special frames of predetermined type in said one or more reference video streams;

creating a unique digital signature file for each said reference video stream that is uniquely dependent on the individual characteristics of said special frames, said unique digital signature file comprising a table for each special frame identifying the proportion of pixel values in defined categories;

storing said unique digital signature file for each said reference stream in a memory;

receiving a candidate video stream consisting of sequences of successive frames;

identifying said selected special frames of predetermined type in said candidate video stream;

creating a unique digital signature file for each said candidate video stream that is uniquely dependent on the individual characteristics of said special frames;

comparing said unique digital signature file of said candidate video stream with each said stored digital signature file; and identifying said candidate video stream as corresponding to a reference video stream in the event of a positive match of said digital signature files of said reference stream and said candidate stream in accordance with predetermined criteria; and wherein a slider is assigned to each special frame in a signature file that matches a special frame in a candidate sequence, and the slider is moved by one special frame toward the end of the file whenever a match occurs.

9. An apparatus for detecting video sequences comprising:

means for receiving one or more reference video streams consist of sequences of successive frames;

means for identifying selected special frames of predetermined type in said one or more reference video streams;

means for creating a unique digital signature file for each said reference video stream that is uniquely dependent on the individual characteristics of said special frames, said unique digital signature file comprising a table for each special frame identifying the proportion of pixel values in defined categories;

means for storing said unique digital signature file for each said reference stream in a memory;

means for receiving a candidate video stream consisting of sequences of successive frames;

means for identifying said selected special frames of predetermined type in said candidate video stream;

means for creating a unique digital signature file for each said candidate video stream that is uniquely dependent on the individual characteristics of said special frames, means for comparing said unique digital signature file of said candidate video stream with each said stored digital signature file; and means for identifying said candidate video stream as corresponding to a reference video steam in the event of a positive match of said digital signature files of said reference stream and said candidate stream in accordance with predetermined criteria.

10. An apparatus as claimed in claim 9, wherein said defined categories are luminance and hue.

11. An apparatus as claimed in claim 9, wherein said signature file also stores the duration of the sequence.

12. An apparatus as claimed in claim 9, wherein said signature file also stores the number of luminance or hue categories considered.

13. An apparatus as claimed in claim 9, wherein said signature file also includes information relating the difference in pixel values pairs of frame in a sequence.

14. An apparatus as claimed in claim 9, wherein said special frames correspond to a Cut, a Startframe, or a Timeout.

15. An apparatus as claimed in claim 14, wherein when a match is found between the digital signature of a frame in the candidate sequence and the stored sequence, said comparing means tags the frame in the stored sequence and attempts to match each successive frame of the same type in the target sequence with the corresponding frame of the same type in the stored sequence and so on to the end of the stored sequence, said identifying means determining that a positive match has occurred when the number of matches in a sequence exceeds a predetermined value.

* * * * *